United States Patent
Gyllensward

(10) Patent No.: US 9,858,034 B2
(45) Date of Patent: Jan. 2, 2018

(54) COLOUR-DISCRIMINATING CHECKSUM COMPUTATION IN A HUMAN-MACHINE INTERFACE

(71) Applicant: BOMBARDIER TRANSPORTATION GMBH, Berlin (DE)

(72) Inventor: Erik Gyllensward, Vasteras (SE)

(73) Assignee: Bombardier Transportation GmbH, Berlin (DE)

( * ) Notice: Subject to any disclaimer, the term of this patent is extended or adjusted under 35 U.S.C. 154(b) by 187 days.

(21) Appl. No.: 14/441,581

(22) PCT Filed: Nov. 19, 2013

(86) PCT No.: PCT/EP2013/074130
§ 371 (c)(1),
(2) Date: May 8, 2015

(87) PCT Pub. No.: WO2014/079826
PCT Pub. Date: May 30, 2014

(65) Prior Publication Data
US 2015/0277838 A1  Oct. 1, 2015

(30) Foreign Application Priority Data
Nov. 22, 2012 (EP) ..................... 12193869

(51) Int. Cl.
*G06F 3/147* (2006.01)
*G09G 5/02* (2006.01)

(52) U.S. Cl.
CPC ............. *G06F 3/147* (2013.01); *G09G 5/02* (2013.01); *G09G 2340/10* (2013.01);
(Continued)

(58) Field of Classification Search
None
See application file for complete search history.

(56) References Cited

U.S. PATENT DOCUMENTS 6,839,055 B1  1/2005 Nguyen
2003/0038844 A1  2/2003 Royalty
(Continued)

FOREIGN PATENT DOCUMENTS

EP  2254039  1/2010
EP  2273369  1/2011
(Continued)

OTHER PUBLICATIONS

International Search Report prepared by the European Patent Office dated Jan. 22, 2014, for International Application No. PCT/EP2013/074130.

(Continued)

*Primary Examiner* — Kent Chang
*Assistant Examiner* — Benjamin Morales Fernande
(74) *Attorney, Agent, or Firm* — The Webb Law Firm

(57) ABSTRACT

A display (101) is controlled by a display drive signal (S2) generated based on an input signal (S1) encoding a safety-critical quantity. A checksum (S4) is computed based on the display drive signal and is used to verify the rendering process by which the display drive signal has been produced. In order for the checksum to depend on the safety-critical quantity only, the checksum is computed based on a filtered display drive signal (S3) in which pixels with a certain value have been excluded. In embodiments of the invention, safety-noncritical quantities are represented using colors that are due to be excluded. Similarly, a checksum for verifying a given quantity can be made independent of other quantities represented in adjacent screen areas by representing the latter using excluded colors. In other embodiments, pixel values corresponding to particular pixel positions may be excluded from contributing.

15 Claims, 2 Drawing Sheets

(52) U.S. Cl.
CPC ..... *G09G 2340/12* (2013.01); *G09G 2358/00* (2013.01); *G09G 2380/10* (2013.01); *G09G 2380/12* (2013.01)

(56) References Cited

U.S. PATENT DOCUMENTS

| | | |
|---|---|---|
| 2004/0249522 A1 | 12/2004 | Bernard et al. |
| 2007/0040841 A1* | 2/2007 | Kim .................. G09G 5/003 345/531 |
| 2007/0046680 A1 | 3/2007 | Hedrick et al. |
| 2011/0157222 A1 | 6/2011 | Morlec |
| 2012/0245759 A1 | 9/2012 | Guillot |
| 2013/0120437 A1* | 5/2013 | Bajaj .................. G06T 5/00 345/597 |

FOREIGN PATENT DOCUMENTS

| | | |
|---|---|---|
| EP | 2353089 | 8/2011 |
| JP | 2011523918 | 8/2011 |
| WO | WO 2009/141684 | 11/2009 |

OTHER PUBLICATIONS

Written Opinion of the International Searching Authority prepared by the European Patent Office dated Jan. 22, 2014, for International Application No. PCT/EP2013/074130.
Official Action (English translation) of Japanese Patent Application No. 2015543407, dated Sep. 13, 2016, 3 pages.

* cited by examiner

COLOUR-DISCRIMINATING CHECKSUM COMPUTATION IN A HUMAN-MACHINE INTERFACE

CROSS REFERENCE TO RELATED APPLICATIONS

This application is a national stage application under 35 U.S.C. 371 and claims the benefit of PCT Application No. PCT/EP2013/074130 having an international filing date of Nov. 19, 2013, which designated the United States, which PCT application claimed the benefit of European Patent Application No. 12193869.0 filed Nov. 22, 2012, the disclosure of each of which are incorporated herein by reference.

TECHNICAL FIELD

The invention disclosed herein relates to visual displays for use in environments where high safety requirements apply. More precisely, it relates to a visual display module adapted to continuously verify information that it displays.

BACKGROUND

In safety-critical environments where electronic visual displays are used, such as the operator's cab of a public transport vehicle, measures are taken to prevent such displays from misleading the operator by displaying a corrupted value when a failure occurs. In the particular case of a railway vehicle, safety-critical information to be displayed to the operator includes vehicle speed, brake pressure, engine temperature, closure status of doors and coupling status of the train set.

Consider an input signal encoding the value of a physical quantity (measured by a sensor provided in the vehicle, computed from measured values or read from a data register or the like) to be presented in human-readable format on a visual display. The display is controlled during operation by a display drive signal indicating the value of each pixel of the display image. As is known to those skilled in the art, the display image perceived by the viewer is a stream of images (frames) displayed sequentially at the update frequency of the visual display. Thus, as used herein, a display drive signal encodes the values of all pixels in a frame by enumerating them in some predefined order, and then starts over with the pixels of the next frame. In a composite display drive signal, values of more than one pixel may be enumerated at a time. In a digitally controlled visual display, the pixel values are chosen from a predefined discrete pixel value range with a finite number of elements. An element in the pixel value range may for instance correspond to a particular pixel colour to be produced by the visual display.

In a failure scenario, an error (e.g., a runtime error, a programming error or other systematic error) occurs in the process of generating the display drive signal on the basis of the input signal. This process may imply several steps, such as converting the information encoded by the input signal to a different number format, rounding off to a desired number of digits, converting to a suitable unit of the physical quantity, typesetting the number as a bitmap text image, colouring the text image (possibly in a manner dependent on the value, to warn the operator of out-of-range values), aligning the text image and adding constant graphical elements such as frames, logotypes, notations of quantities and units etc.

Visual displays of this type and corresponding safety measures have been described in the prior art. For instance, the applicant's own application published as EP 2254039 A1 discloses a visual display module according to the preamble of the independent claims in this application. EP 2273369 A1 and EP 2353089 A1 describe visual display modules having verification functionalities adapted to discover errors occurring in the processing steps by which the display drive signal is generated.

US 2007/0046680 A1 describes an aircraft instrument flight display, wherein a video graphics processor intermittently produces a display drive signal for rendering a predefined test page. An integrity checking function extracts a checksum from the display drive signal values for the test page, which are stored in a memory, and compares this with an expected checksum value for the test page.

US 2004/0249522 A1 describes a system for transmitting information onboard an aircraft. In a first implementation disclosed in this document, a checksum is transmitted from an avionics device acting as data source to an interface means for displaying the information. The interface means compares the received checksum with a checksum computed on the basis of the information as received. In an alternative implementation, the checksum computed in the interface means is transmitted back to the avionics device, in which the comparison takes place. In both implementations, either checksum is transmitted over the same data link as the information to be displayed.

U.S. Pat. No. 6,839,055 B1 discloses a system for providing an error indication of video data, in which a diagnostic routine generates a set of test video data and compares the generated error indication with a standard error indication to determine an error condition. If an error condition is determined to exist, a message to this effect is displayed on a display.

These known devices may be improved from the point of view of computational efficiency, such as by modifications or improvements allowing them to reach an equivalent verification or, as the case may be, a failure indication at less computational expense.

Furthermore, US 2011/157222 A1 relates to a system comprising a first, more secure domain, a second, less secure domain, and a monitor which is adapted to display data originating from the domains. A domain is defined as an embedded aircraft electronics system. In accordance with the different security levels of the domains, the system is adapted to display corresponding data either in an active or an inactive zone of the display, wherein user input is received only through the active zones. The system may adapt the number and extent of the active zones to command windows and similar input means as they are displayed on the monitor. The more secure domain controls the displayable colours for each zone and may select a visually distinct colour configuration in inactive zones than in active zones. The operation may be controlled by a display management computer including a fusion module, wherein an integrity control arranged between the fusion module and the domains may be used in order to strengthen the security, e.g., by preventing the fusion module from receiving data whose origin is not authorized and passing these on to the monitor.

SUMMARY

It is an object of the present invention to propose a visual display suitable for presenting safety-critical information encoded in an input signal in human-readable format. It is a first particular object to propose a visual display of this type with computationally lean safety verification. It is a second particular object to propose a visual display of this type which is easily configurable and/or in which the safety verification is operable with a limited amount of pre-stored reference information.

There is provided a method of presenting information encoded in an input signal on a visual display. The visual display is adapted to display at least one image frame based on a display drive signal comprising pixel values in a predefined discrete pixel value range. The pixel value range may be a finite enumeration of possible pixel values or component values which are possible to combine for one pixel; the pixel value range need not be an interval of integers or a union of such intervals. The method comprises:

based on an input signal, generating a display drive signal controlling the visual display;
based on the display drive signal, computing a checksum of a supervised region of each image frame; and
verifying the display drive signal for a given image frame by comparing the checksum, or a value derived therefrom, with the input signal, or a value derived therefrom.

In this connection, it is noted that the supervised region, which is preferably invariant between consecutive frames, refers to the area whose associated display drive signal values are subject to verification by the method. It is emphasised that the supervised region, as used herein, is an arbitrary collection of pixel positions and not limited to being a connected set or a set of a particular geometric shape. Further, said verification may take place based on a direct comparison between the checksum and the input signal, but one or both of these values may alternatively be replaced by a value derived from the checksum or the input signal and varying in dependence with the current value of a respective one of the checksum or the input signal.

According to a first aspect, the checksum for use in said verification is computed subject to exclusion of at least one element in the pixel value range, wherein any pixels carrying a value equal to this element in a given frame do not contribute to the checksum, even if these pixels are located in a supervised region. Hence, the checksum for a given frame is computed in a value-discriminating fashion, whereby the checksum is independent of data relating to those pixels to which the display drive signal assign any of the excluded elements in the pixel value range.

In a second aspect, a visual display module is adapted to be communicatively connected to a processing means for generating a display drive signal on the basis of an input signal. The display drive signal, which is suitable to be supplied to a visual display, comprises pixel values in a predefined discrete pixel value range. A checksum extractor is adapted to compute a checksum of a supervised region of each image frame. A display supervisor is adapted to verify the display drive signal for a given image frame by comparing the checksum and the input signal or performing an equivalent comparison operation as discussed previously. According to either aspect, the checksum extractor is preceded by a colour filter configured to exclude such values of the display drive signal that are equal to at least one element in the pixel value range, so that such values do not contribute to the checksum computed by the checksum extractor.

It is understood that the visual display module may be implemented in a distributed fashion, wherein the checksum extractor, display supervisor and colour filter are located in a single one, two or three physical units. Clearly, neither the processing means, the operation of which is to be supervised by the visual display module, nor the visual display is an essential part of the invention. As such, the visual display module may comprise the colour filter checksum extractor and the display supervisor; the processing means is an optional component in the visual display module, and the visual display is a further optional component which may be present or absent independently of the inclusion of the processing means.

Similarly, the method according to the first aspect may be embodied as a process for comparing an input signal and a display drive signal, which has been generated based on the input signal by a different entity than the one performing the process for comparing. As such, the process for comparing includes the steps: based on the display drive signal, computing a checksum of a supervised region of each image frame, wherein the checksum is computed while excluding at least one element in the pixel value range from contributing to the checksum; and verifying the display drive signal for a given image frame by comparing the checksum, or a value derived therefrom, with the input signal, or a value derived therefrom.

According to each of the first and the second aspects, the invention provides a verification (in particular, a checksum-based verification) of the display drive signal which requires a smaller total amount of computations than if the entire pixel value range had been allowed to contribute to the checksum. The advantage is twofold. Firstly, the checksum itself is computed using a smaller input data set (or at least an input data set in which a larger share of the values are neutral, see next paragraphs). Secondly, the comparison process becomes simpler because the process of deriving a value from the checksum—or alternatively, of deriving a value from the input signal—becomes less complex. Because the invention can successfully remove the influence from information which is not the information that is being supervised, there is a potential simplification in all embodiments where the checksum is verified against a reference checksum extracted from a reference display drive signal which has been generated on the basis of the input signal; this is because in a properly configured system the checksum will only be influenced by that information in the input signal which is to be supervised. A similar advantage will be obtained where the reference checksum is prepared by indirect computations having the information in the input signal as basis or where the reference checksum is retrieved from a memory (see below). Embodiments of the invention may therefore achieve the above first particular object.

It is important to note that the invention is able to verify the entire display drive signal for a given frame by a reduced total amount of computations. This is in contrast to parallelization approaches in which data in a display drive signal are be split (e.g., in accordance with its RGB components or in accordance with a finite colour palette) and treated by parallel verification processors, from which all must provide a positive partial verification decision in order for a positive total verification decision to be issued; this may increase speed but does not reduce the total amount of computations. A visual display module according to the invention can be made as safe as a prior art device, e.g., if the excluded elements in the pixel value range are configured to correspond to such variable or constant graphical constituents in a graphical user interface which are safety-noncritical.

It is noted that said exclusion of pixels carrying values may be implemented either by disregarding these pixels in the checksum computation, whereby, for each frame, the checksum is computed based on values from a proper subset of the supervised region. Alternatively, the pixels to be excluded are assigned neutral values (in the sense that their contribution does not influence the checksum result) before the checksum is computed based on all pixels of the supervised region.

The invention is defined by the independent claims. The dependent claims define advantageous example embodiments.

In one example embodiment, the section executing the method (e.g., the display supervisor) initially receives a data identifying at least one supervised region and the one or more elements in the pixel value range which are to be excluded from the checksum computation. A rectangular supervised region may be identified by two of its corners. Preferably, it is possible to define elements to be excluded in one supervised region independently of any other supervised regions. Such data may be received in a configuration phase, such as during assembly or during an initialization executing each time the visual display module is powered up. In this embodiment, the extent, location, size etc. of the supervised regions can be easily reconfigured.

In one example embodiment, the input signal encodes at least two independently variable quantities, such as brake pressure, vehicle speed, line voltage, door status. The two quantities are represented in partially overlapping supervised regions of the frame (including the case where the supervised regions coincide identically as well as the case where one supervised region is included in the other). This localization of the representations to overlapping supervised regions may be encoded in the input signal or may follow by a decision made by a processing means or other rendering component in the visual display. The display drive signal is generated by representing each of the at least two independently variable quantities using a specific element in the pixel value range, wherein the specific element is not used to represent any other quantity of said at least two independently variable quantities. With this setup, the checksum of a given supervised region is computed while excluding the specific element of a different supervised region from contributing. As used herein, a specific element is used to represent a quantity if there is, at least in some frames in a sequence, at least one pixel which varies as a function of the quantity. For instance, the specific element may correspond to a colour of text or symbols, a colour of an indicator finger, and a background colour on which text, symbols or graphical components are drawn. Because the specific element is not used for representing the other quantity in the overlapping other supervised region, the checksum can be computed without interference from the variation of the other quantity. This is the case in particular if the specific element is not used for representing the other quantity in the overlap area with the other supervised region, that is, if the intersection of the two supervised regions is free from pixels which represent the other quantity and which assume values equal to the specific element in the pixel value range. This is advantageous insofar as overlapping supervised areas may be defined without increasing the amount of computations involved in the verification. Instead, the value-discriminating nature of the checksum computation separates those pixels which are used to represent different quantities encoded in the input signal. For instance, it is possible to represent current values of a plurality of quantities in closely packed circular dials each contained in a rectangular supervised region.

In a variation to the preceding example embodiment, the step of excluding a first element in the predefined pixel value range from contributing to the checksum of a first supervised region and further configured excluding a second element in the predefined pixel value range, different from the first element, from contributing to the checksum of a second supervised region is practised independently. This is to say, if the particular layout where the two or more independently variable quantities are represented in different, partially overlapping supervised regions is achieved by an entity other than the visual display module (e.g., the layout may be encoded in the input signal), the invention may relate merely to the measure of excluding the specific element associated with the other quantity from contribution to the checksum.

In an advantageous further development of any of the two preceding example embodiments where different specific elements in the pixel value range are used to represent different quantities, the specific elements correspond to pixel colours which are visually indistinguishable. Because however the specific elements are encoded by machine-distinguishable values, the respective checksums may be computed in a separated fashion, whereby the variation of one quantity does not influence the checksum associated with the other quantity. For example, an average human viewer will perceive the RGB-coded colours (R,G,B)=(255, 0, 0), (R,G,B)=(254, 0, 0) and (R,G,B)=(253, 0, 0) as the same red colour. This is advantageous insofar as the option to represent different quantities by distinct but visually indistinguishable colours—that is without the user's knowledge—removes the need to add a further layer to the display drive signal, to provide a separate checksum control signal or the like. It may also be aesthetically more pleasing to reduce the number of visually distinct colours in a meter panel in a dashboard.

In a further development of the preceding example embodiment, the display drive signal generation includes a step where a non-specific element in the pixel value range is used in at least two of said supervised regions. The non-specific element may for instance be used for safety-non-critical symbols or a background. In the computation of the checksum of a given supervised region, both the specific element of any different supervised region and the non-specific element are excluded from contributing. In particular, the non-specific element may be excluded from contributing if it is used in a supervised region which overlaps at least partially with the given supervised region.

In one example embodiment, the verification of the display drive signal includes retrieving data from a memory (or look-up table) storing predefined input signal values and associated pre-computed reference checksums. This may reduce the computational effort and hardware expense significantly in comparison with the case where the reference checksum is produced by generating a reference display drive signal and extracting the checksum from this. In one implementation, the input signal value is used to retrieve a corresponding reference checksum, which is compared with the actual checksum. In another implementation, the checksum is used to retrieve a corresponding predefined input signal value, which is compared with the actual input signal value. Either way, the value-discriminating nature of the checksum computation limits the number of entries to be stored in the memory.

In a first scenario, it is assumed that a first quantity with $N_1$ distinct states is to be represented in a first supervised area and a second quantity with $N_2$ distinct states is to represented in a second supervised area, which overlaps at least partially with the first supervised area. According to prior art, if some of the $N_2$ distinct states of the second quantity influences the appearance of the first supervised area in such manner that the checksum may vary, then the memory must store $N_1 \times N_2$ entries, corresponding to the number of combinations of a value of the first and the second quantity. According to the present example embodiment, however, the variation of the first and second quantities may be separated by way of using different elements in the pixel value range for their representation, and so, because the checksum of the first supervised region is independent of the second quantity, the memory need only store $N_1$ entries. Similarly, the number of entries relating to the second supervised region may be limited to the number of distinct values of the second quantity, $N_2$.

In a second scenario, a given supervised region is used for representing both a safety-critical quantity to be verified by way of checksums and a safety-noncritical quantity which may be ignored as far as checksums are concerned. According to the prior art, each distinct value of the safety-critical quantity may combine with all possible values assumed by the safety-noncritical quantity and lead to a corresponding number of different checksums. According to this example embodiment, however, the safety-noncritical quantity is represented using an element in the pixel value range which is excluded from contributing to the checksum of that supervised region. For example, the colours used for both the symbols and their background are excluded elements, whereby the number of ignored pixels is kept constant between different frames and does not influence the checksum either directly or indirectly.

In both scenarios, the effort required to produce the data to be stored in the memory (e.g., in a preliminary configuring procedure) will decrease accordingly if the respective quantities are represented using specific elements and the checksums of the supervised regions are computed in a value-discriminating manner.

In an example embodiment, the excluded element in the pixel value range corresponds to a pixel colour to be produced by the visual display. The concept of a colour (or colour point) is to be understood broadly. For instance, example embodiments of the invention may treat colours with the same hue but different saturation as different colours for purposes of checksum calculations. In an RGB representation, such colours may correspond to triples with equal proportions, e.g., light grey (R, G, B)=(221, 221, 221) and normal grey (R, G, B)=(204, 204, 204), and further the green shades (R, G, B)=(0, 255, 127) and (R, G, B)=(0, 238, 118), which have approximately identical hues.

In an example embodiment, at least two elements in the pixel value range are excluded from contributing to the checksum. This example embodiment is advantageous insofar as the number of contributing pixels may be maintained constant between consecutive image frames, namely, if the excluded element in the pixel value range is used for variable foreground components (e.g., text or symbols that are unrelated to the quantity to be supervised) but not for background components. If hypothetically such an unrelated symbol occupying P pixels with the excluded colour is produced in a supervised region which additionally includes Q background pixels contributing by 3 units each to the checksum, then—if other possible variations are ignored—the checksum of the same supervised region in a subsequent frame will increase by 3×P when the symbol is no longer being produced. According to the present example embodiment, however, both the background colour and the symbol colour are excluded from contributing, so that the checksum is independent of variations in the unrelated quantity represented by the symbol.

In an example embodiment, the visual display module further has a bitmasking functionality, operable to exclude one or more specified pixel positions from contributing to the checksum. The bitmasking functionally may be implemented in a bitmask filter. The bitmask to be applied may be configured independently for different image frame and/or independently for each supervised region. In one implementation, the bitmask is a set of pixel positions which is defined for all supervised regions in a display view (e.g., associated with a specific menu or a specific operating mode) and remains constant for that display view. In different implementations, the pixels in a bitmask may either be the contributing pixels or the non-contributing pixels, depending on the convention used.

It is noted that this functionality may be practised independently of the other features of this invention. As such, the invention may be embodied as a method comprising:

generating, based on an input signal, a display drive signal controlling a visual display;

computing, based on the display drive signal, a checksum of a supervised region of each image frame, wherein the checksum is computed while excluding at least one pixel position from contributing to the checksum; and verifying the display drive signal for a given image frame by comparing the checksum, or a value derived therefrom, with the input signal, or a value derived therefrom.

Similarly, the invention may be embodied as a visual display module with the same functional components as previously discussed, not necessarily comprising the colour filter but instead comprising a bitmask filter, which is arranged between the processing means and the checksum extractor and is configured to exclude at least one pixel position from contributing to the checksum.

As such, various embodiments of the invention may offer the following options: value discrimination only, bitmasking only or a combination of bitmasking and value discrimination. It is noted that value discrimination is effective:

to achieve a checksum separation—in the sense discussed above—of two (partially) overlapping supervised regions, if the safety-relevant quantities in these regions are represented using different elements in the pixel value range; and to remove the influence from a safety-relevant or safety-nonrelevant symbol which is intersected or covered by a graphical element which varies as to its position and/or colour (e.g., a rotating indicator finger) and which represents a quantity supervised by a checksum. If the symbol is safety-relevant, then it cannot be excluded by using a bitmask unless the bitmask can be defined independently for each supervised region (i.e., a supervised region can have any shape), which is typically not the case.

(Such a value discrimination approach can be applied to speedometer panels with indicator fingers extending towards a circumferential edge the colour of which varies as a function of the current speed limit. In this situation, while the colour used for representing the indicator finger contributes to the checksum, the colours which the edge may assume are preferably excluded.) Bitmasking is effective:

to remove the influence from a safety-nonrelevant symbol which is represented in a supervised region. In this situation, especially if the symbol varies by disappearing and reappearing, it may be preferable to use bitmasking rather than value discrimination, since the variation of the safety-nonrelevant symbol leads to a change in the number of pixels contributing the checksum and thus changes its value; and to remove the influence from a safety-nonrelevant symbol which is intersected or covered by a graphical element which varies as to its position and/or colour (e.g., a rotating indicator finger) and which represents a quantity supervised by a checksum.

A combination of bitmasking and value discrimination is effective:

to remove the influence of two symbols, one being safety-relevant and the other safety-nonrelevant which are intersected or covered by a graphical element which varies as to its position and/or colour (and which represents a quantity supervised by a checksum.

The present invention may also be embodied as a computer program product including a computer-readable medium with computer-executable instructions operable to cause a programmable computer to perform the method according to the first aspect of the invention. Computer readable media may comprise computer storage media (or non-transitory media) and communication media (or transitory media). As is well known to a person skilled in the art, the term computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, compact discs (CD), digital versatile disks (DVD) or other optical disk storage, magnetic cassettes, magnetic tape, magnetic disk storage or other magnetic storage devices, or any other medium which can be used to store the desired information and which can be accessed by a computer. Further, it is well known to the skilled person that communication media typically embodies computer readable instructions, data structures, program modules or other data in a modulated data signal such as a carrier wave or other transport mechanism and includes any information delivery media.

It is emphasized that the invention relates to all combinations of features, even if they are recited in mutually different claims.

BRIEF DESCRIPTION OF THE DRAWINGS

Embodiments of the invention will now be described with reference to the accompanying drawings, on which.

All the figures are schematic and generally only show parts which are necessary in order to elucidate the invention, whereas other parts may be omitted or merely suggested. Unless otherwise indicated, like reference numerals refer to like parts in different figures.

DETAILED DESCRIPTION OF EMBODIMENTS

Figure 1:
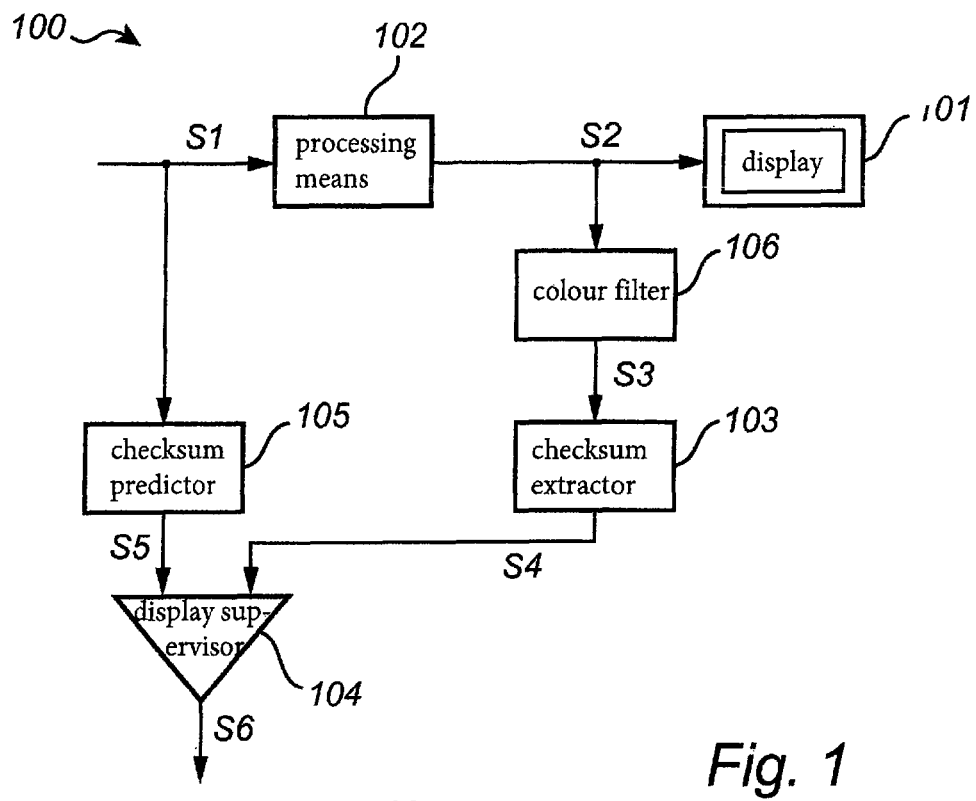
FIGS. 1 and 2 are generalized block diagrams of visual display modules in accordance with example embodiments of the invention.

As used herein, a checksum (or hash sum or digest) is the value of a non-injective deterministic function (hash function) of the digital values of a set of pixels. A non-injective function with discrete values may be referred to as rank-deficient. The values of a checksum are numbers having a number of bits that may or may not coincide with the word length of the computer system in which it is implemented. As is known to the skilled person, checksums may be used to detect errors introduced by data transmission, which ideally delivers an identical copy at the destination. This may be achieved by sending a first checksum in parallel to the data and checking that a second checksum, computed on the basis of the transmitted data, agrees with the first checksum. By virtue of the non-injectivity of the checksum, this process entails transmitting a total amount of data that is less than twice the information to be transmitted. As only the two checksums are compared, it moreover reduces the comparison effort.

According to the present invention, checksums computed in a specific, value-discriminating way are utilized to verify the correctness of a combined processing and (internal) transmission process, namely the generation and handling of the display drive signal for producing a human-readable representation of information encoded by an input signal in the form of a display image. Although such processing obviously does not produce an identical copy of the input signal, its result is yet deterministic and can be predicted once the input signal is known. It is emphasised that individual frames are verified continuously during operation of the display module, not only during a testing process or the like.

As follows by the definition above, a display drive signal comprises a sequence of pixel values to be produced by the display and to form a visible image. Preferably, the display is controlled by a display drive signal consisting of time segments that represent single pixel values, which is then 'ready to use' in the sense that no more processing of the signal will take place. Therefore, the risk of a processing error causing a disagreement between the display image and the display drive signal is very limited. The risk of processing errors causing a discrepancy between an input signal and the display drive signal is typically higher.

A visual display module according to the invention may include a completely passive display screen, such as a television receiver based on cathode-ray-tube (CRT) technology, wherein control commands such as end-of-line are included directly into the display drive signal. If such screens are driven beyond their capabilities, such as by addressing non-existent pixels, the display drive signal is usually ignored and an error message is presented. The sequential nature of display drive signals have been inherited by some of the more recent display technologies, such as thin-film transistor liquid-crystal display (TFT LCD), in which the colour point of individual pixels may be controlled by means of transistor switches associated with the respective pixels. Common TFT receive the display drive signal digitally, or are configured to sample discrete values from an analogue display drive signal, thereby emulating the movement of the electron beam in a CRT display, and forward each sample to the relevant transistor switch. The sampling and forwarding structures are synchronised by the display drive signal but are otherwise independent of the information encoded therein. Thanks to common protection circuitry similar to that of CRT displays, a failure in such structures leads to a state equivalent to a bus error (out-of-range addressing) which may put the entire LCD out of operation. Thus, the risk of corrupted information appearing on the screen for the reasons discussed in this paragraph is limited and can be mastered through design of a display module by selecting display hardware classified in accordance with an appropriate safety standard and/or by including redundant hardware, such as two independent backlight controllers. Unlike certain types of software, which may oftentimes be onerous to safety-verify, display hardware can generally speaking be classified at a limited cost.

Similarly, it will typically require a relatively limited cost and effort to arrange trusted communication channels for transmitting input signals to the visual display module. The display drive signal may for instance be transmitted from the processing means to the display by low-voltage differential signalling (LVDS) or transition-minimised differential signalling (TMDS), which allows high transmission rates while generating little electromagnetic interference. A parallel bus, or other means for parallel single-ended signalling, may be used as an alternative. Some examples of display drive signal formats used in industry are VGA, SVGA, XGA, SXGA, UXGA, which may be provided to the display over a single-ended parallel transmission line. Digital formats can also be provided by LVDS or TMDS signalling.

FIG. 1 schematically shows a visual display module (human-machine interface) 100 according to the invention. An input signal S1 is fed to both a processing means 102 and a checksum predictor 105. On the basis of the input signal S1, the processing means 102 is adapted to generate a display drive signal S2 to be provided to a display 101. The signal S2, which may be transmitted by LVDS, TMDS, parallel or other suitable signalling (see below), encodes a stream of pixel values and can be used by the display 101 substantially without further processing. The input signal S1 is also used by the checksum predictor 105 to generate a reference checksum S5 of a supervised area of the display frames. The checksum predictor 105 may be implemented as a memory (or hash table) storing predefined input signal values and associated pre-computed reference checksums; alternatively, it may be implemented as a processor (not shown) configured to produce a reference display drive signal in parallel to the processing means 102 followed by a reference checksum calculator (not shown). In order to verify the accuracy of the display drive signal S2, a checksum S4 generated by a checksum extractor 103 on the basis of the display drive signal S2 is compared with the reference checksum S5 by a display supervisor 104. Any difference between the reference checksum S5 and the checksum S4 that the display supervisor 104 detects generates an error signal S6 which may trigger suitable safety measures, such as activation of a visual or audible signal to the user (e.g., complete or partial blanking of the display, or disconnection from a power supply) or interruption of receipt of the input signal S1, which notifies surrounding units of a malfunction of the visual display module 100. Upstream of the checksum extractor 103, there is arranged a colour filter 106 which acts as a value-selective (or value-discriminating) component that prevents pixel values in the display drive signal S2 from contributing to the checksum S4. For this purpose, the colour filter 106 outputs, based on the display drive signal S2, a filtered display drive signal S3, in which such pixel values that are equal to excluded elements in the pixel value range (see above) have been omitted or replaced by neutral values. Alternatively, the value-discriminating functionality may be integrated in the checksum extractor 103.

In a variation to the embodiment shown in FIG. 1, the filtered display drive signal S3 is supplied by a bitmask filter 106 having a bitmasking functionality. The bitmask filter 106 inputs the display drive signal S2, identifies those pixel values which correspond to pixel positions in a configurable bitmask and either omits these pixel values or replaces them by neutral values. The result of this processing, which may be said to replace the operations completed by the colour filter 106 in FIG. 1, is a filtered display drive signal S3 which is supplied to the checksum extractor 103 in the same way as discussed previously.

In a further variation, the colour filter 106 in FIG. 1 is replaced by a combined bitmask and colour filter. In such a combined filter, a checksum may be computed by checking, for a given pixel,
whether the pixel is in the supervised region associated with the checksum to be computed;
whether colour filtering is active;
if so, whether the pixel carries a value in the pixel range which is to be excluded;
whether bitmask filtering is active;
if so, whether the pixel is in a pixel position to be excluded.

These checks are preferably carried out in the above order. Depending on the outcome of each step, the process either proceeds to the next step, is interrupted by a decision to exclude the pixel (e.g., if the pixel is outside the concerned supervised region) or is interrupted by a decision to include the pixel (e.g., the pixel is in a supervised region, has a non-excluded colour and the bitmask filtering is inactive).

Figure 2:
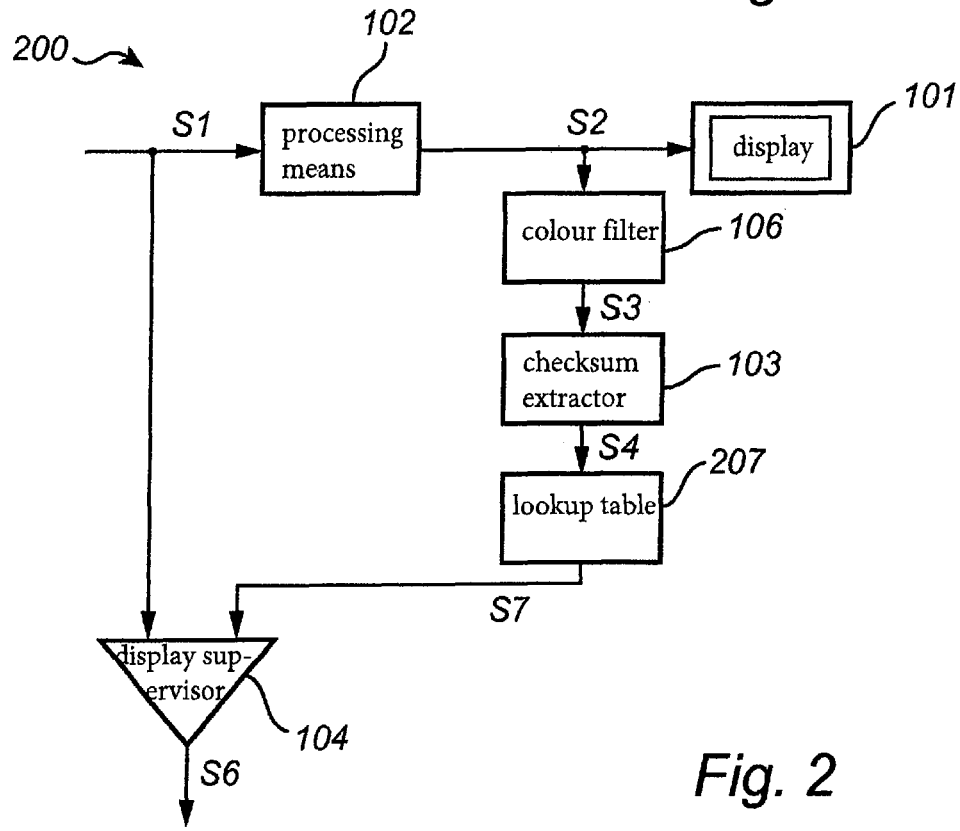

FIG. 2 shows a visual display module 200 with an alternative layout. Based on the checksum S4, a lookup table 207 (or memory) returns at least one possible input signal value S7 which is associated with the current checksum value. For this purpose, the lookup table 207 stores predefined input signal values and associated pre-computed reference checksums. Because checksum functions are typically non-injective, there may be more than one distinct input signal value which will result in a given checksum value. In this visual display module 200, the display supervisor 104 may receive an actual input signal value S1 and compare this for each frame with at least one corresponding possible input signal value S7. If the display supervisor 104 detects at least one match, it may consider the display drive signal S2 as verified for the current frame. This may be signalled by outputting a negative error signal S6 from the display supervisor 104, indicating that the visual display module 200 is operating normally.

Clearly, the variations including bitmask filtering discussed above may be implemented in the visual display module shown in FIG. 2 as well.

The hardware components discussed above may be any kind of microprocessors or microcontrollers, and one physical hardware unit may be responsible for two or more processing tasks. However, to ensure the desired safety integrity level, the unit(s) responsible for generating the display drive signal is preferably separated from the units engaged in verifying the display drive signal, in order to decrease the risk of an error being overlooked due to a hardware failure affecting both operations. It is noted that a the checksum extractor is preferably a field-programmable gate array (FPGA), an application-specific integrated circuit (ASIC), a system-on-a-chip or the like.

It may be beneficial to include a frame buffer in the processing means 102. This will allow the generation of the display drive signal S2 to take place at a rate that may differs momentarily from the rate at which the display 101 is adapted to receive the display drive signal S2. To support such non-synchronous processing, it may be suitable to define a sliding time window in which discrepancies are tolerated. More precisely, the display supervisor 104 may be programmed to ignore isolated errors or short episodes where the checksum S4 and the reference checksum S5 deviate, since such unsynchronized episodes may occur also in a healthy visual display module as a result of normal computational and algorithmic delays when the quantity to be displayed varies over time. As an alternative to this, time stamping or frame number stamping may be applied to the checksums.

The units involved in computing checksums and comparing the checksums may execute trusted software in accordance with the safety standard (see, e.g., EN 50128 in the particular case of railway applications) of the visual display module 100. An advantage of the layouts shown in FIGS. 1 and 2 is that the processing means 102 does not have to be safety certified. This facilitates subsequent software updates and also implies a greater latitude in choosing a software supplier for graphics libraries and the like. Additionally, it limits the amount of software code that needs to be produced in accordance with industry standards for software safety.

In one example embodiment, an input signal S1=0110 0010 0000 1101 is interpreted as a binary representation of an integer number representative of the speed of a vehicle in meters per hour. A binary-to-digital converter converts this number into decimal form, as encoded by signal S11=24845. A rescaling section converts this number into the desired unit, kilometers per hour, and rounds it off to one decimal place. This number is encoded by signal S12=24.8. A typesetting unit uses a font to produce a pixel representation of the number over a pattern of 18×7 pixels. This information is communicated by the display drive signal beginning S2=011000001000001100 L 100100011000010010 L 100100101000010010 L 001001001 . . . , where L denotes a line break, and 0 and 1 refer to different pixel colours to be displayed by the visual display 101.

In this and other example embodiments, the processing means 102 may comprise functional sections for performing one or more of the following operations:

rounding and formatting of numerical values;
linear or non-linear unit conversion, such as between miles per gallon and liters per 100 kilometers, which are both units for measuring fuel efficiency of vehicles;
generation of textual representations of logical values encoded by the input signal, such as by decoding a numerical error code as plain text in a selected language;
generation of a pixel representation of a numerical or logical value by using a vector-coded font which is rasterized;
generation of a graphical pixel representation of a numerical value, e.g., as an image of an analogue pointer instrument indicating this value or a function plot showing the time evolution;
further formatting, such as colouring, possibly in dependence of the actual value of the input signal or another input signal (e.g., the speed limit), to alert the user of out-of-range values;
conversion between various video formats (in terms of resolution, colour coding, refresh rate etc.) to suit the display; and
combination of pixel blocks representing values of different quantities values or guiding information.

In the following discussion, a general checksum will be denoted H(P), where H is a hash function and P is the set of all values contributing to the checksum.

For a monochrome display drive signal S2, a simple checksum may consist of the sum of the pixel values in the supervised region, the value 1 referring to an active pixel and 0 to an inactive pixel, or the sum modulo a fixed number.

If the display 101 is a colour display, the display drive signal S2 encodes each pixel as a colour number associated, through a predefined palette, with a colour point. To illustrate, each colour in the 24-bit red-green-blue (RGB) palette is characterised by a colour triple (r, g, b) of integers in the range [0, 255] or equivalently by a 24-bit binary colour number $2^{16}r+2^8g+b$. It follows that the pixel value range is the discrete set $R=[0, 255]^3$. The checksum may then be the sum of the colour numbers of the pixels in the supervised region. Although the generation of the checksums described above should not be very cumbersome, it can be further alleviated by summing only the last bits of the colour number or by summing the colour numbers modulo a fixed integer. By way of example and not limitations, further possible checksums include:

$$H_1(P)=\Sigma_i[(\rho r_i+\gamma g_i+\beta b_i) \bmod q+s]$$

$$H_2(P)=\Sigma_i[\max\{r_i, g_i, b_i\} \bmod q]$$

where $P=\{(r_i, g_i, b_i): i \in I\}$ is the set of all colour triples $(r_i, g_i, b_i)$ carried by pixels in the supervised region, s is a constant integer, and $\rho$, $\gamma$, $\beta$, q are constant non-zero integers. The checksums $H_1(P)$ and $H_2(P)$ are computed by a summation over all indices i in the set I, and a general checksum H(P) will be computed in the same fashion. The IEEE 802.3 networking standard discloses several checksums, notably CRC-32, which are suitable for use in connection with the present invention. Error-correcting checksums may also be used in embodiments of the invention, as may parity bits, modular sums, position-dependent modular sums and the like.

In example embodiments of the present invention, some pixels in a supervised region are excluded from contributing to a checksum on the basis of their values. Hence, using the same notation as in the previous paragraph, such embodiments may use as checksums H(P'), $H_1(P')$ or $H_2(P')$, where the reduced pixel set $$P'=P\setminus\{(r_i, g_i, b_i):(r_i, g_i, b_i)=(R_1, G_1, B_1) \text{ or } (r_i, g_i, b_i)=(R_2, G_2, B_2)\}$$

where $(R_1, G_1, B_1)$ and $(R_2, G_2, B_2)$ are excluded colours. It is understood that the excluded colours are elements in the pixel value set R, that is, $(R_1, G_1, B_1) \in R$ and $(R_2, G_2, B_2) \in R$. Alternatively, a reduced pixel set may be defined in terms of non-excluded colours $(R_{11}, G_{11}, B_{11}) \in R$ and $(R_{12}, G_{12}, B_{12}) \in R$, as follows:

$$\begin{aligned}P'' &= P \cap \{(r_i, g_i, b_i) = (R_{11}, G_{11}, B_{11}) \text{ or } (r_i, g_i, b_i) \\ &= (R_{12}, G_{12}, B_{12})\} \\ &= \{(r_i, g_i, b_i): (r_i, g_i, b_i) = (R_{11}, G_{11}, B_{11}) \text{ or } (r_i, g_i, b_i) \\ &= (R_{12}, G_{12}, B_{12}), \text{ and } i \in I\}.\end{aligned}$$

and corresponding checksums are H(P''), $H_1(P'')$, $H_2(P'')$. While the pixel set P includes a constant number of pixels—one supervised region—the cardinality of the reduced pixel sets P', P'' according to either representation may vary between different image frames in accordance with the input signal, which in turn determines the screen image to be produced by the display 101.

As noted, both the generation of the reference checksum S5 and the retrieval of a possible input value S7 can be advantageously effected by way of a memory storing pre-calculated checksums. This is possible because the pixel representation of a numerical or logical value encoded by the input signal is always created in the same manner. Table 1 shows the content of an example look-up table storing checksums. The first and second columns refer to values of the input signal S1, in binary and decimal form respectively, and the third column refers to the corresponding checksum or reference checksum.

TABLE 1

Input signal vs. Checksum

| S1 (binary) | S1 (decimal) | Reference checksum |
|---|---|---|
| ... | ... | ... |
| 110 000 010 101 101 | 24749 | 39 |
| 110 000 010 101 110 | 24750 | 43 |
| 110 000 010 101 111 | 24751 | 43 |
| ... | ... | ... |
| 110 000 100 001 101 | 24845 | 43 |
| ... | ... | ... |
| 110 000 100 010 001 | 24849 | 43 |
| 110 000 100 010 010 | 24850 | 41 |
| ... | ... | ... |

In this example, the decimal representation of the input signal is rounded to three significant digits, so that 24750 and 24751 will be represented in an identical manner on the display 101, and consequently the corresponding checksums will be identical. It is noted that when the lookup table 207 in FIG. 2 operates on the basis of this information, a checksum value equal to 43 will return a plurality of possible input signal values, such as 110 000 010 101 110, 110 000 010 101 111 etc. If the display supervisor 104 determines that any of these matches the actual input signal value S1, the display drive signal will be considered to be correct.

Figure 3:
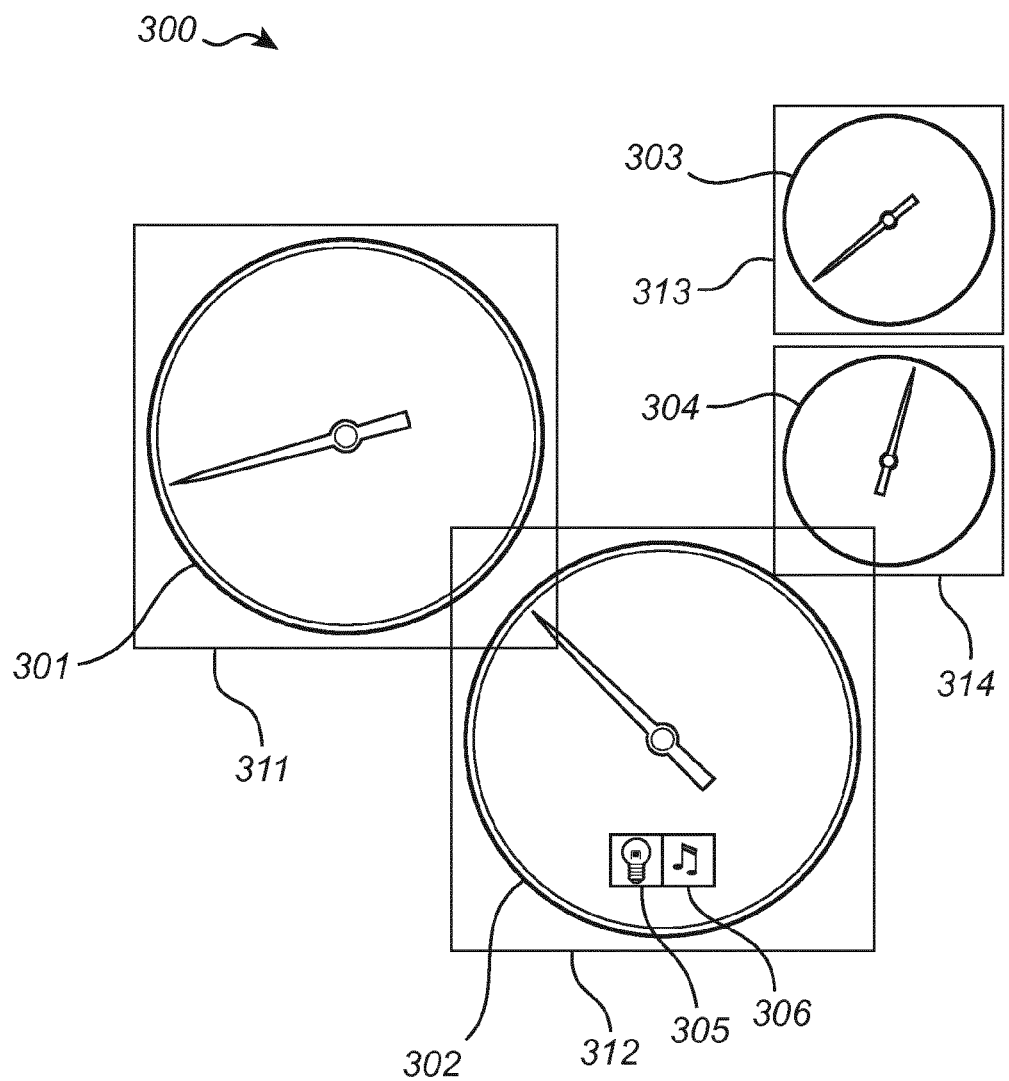
FIG. 3 shows an example screen image to be produced by a display controlled by a display drive signal produced in a visual display module according to FIG. 1 or 2.

FIG. 3 shows an example screen image 300 to be produced by the display 101 in accordance with the display drive signal S2 and including a plurality of pixel patterns with the appearance of closely packed nonrectangular meter panels 301, 302, 303, 304 for visualizing safety-critical quantities $V_1$, $V_2$, $V_3$, $V_4$. In one of the meter panels 302, there are further two status indicators 305, 306 corresponding to safety-noncritical quantities $V_5$, $V_6$. Because the quantities $V_1$, $V_2$, $V_3$, $V_4$ represented in meter panels 301, 302, 303 and 304 are safety-critical, they are contained in respective supervised regions 311, 312, 313, 314. In the interest of economical checksum computations and of avoiding overlaps, the supervised regions 311, 312, 313, 314 have been defined with minimal sizes. In spite of this, there are several overlaps between adjacent supervised regions (e.g., 312 and 314) and even between a supervised region and an adjacent meter panel (e.g., 311 and 302). As explained above, the state space of a given supervised region, where a first quantity is represented, may grow considerably larger if the checksum for that supervised region is influenced by a second quantity which is variable independently of the first quantity. This applies both to those supervised regions in the image 300 which overlap with adjacent supervised regions and to the particular supervised region 312 in which the status indicators 305, 306 are located. Assuming each status indicator 305, 306 may be in two states independently of the other, the pixels in the supervised region 312 may assume four times the number of distinct values of the main quantity to be represented on the meter panel 302.

An example embodiment of the invention may achieve that the checksum of each of the supervised regions 311, 312, 313, 314 is only influenced by a single one of the different quantities $V_1$, $V_2$, $V_3$, $V_4$, $V_5$, $V_6$. This separation may be obtained by representing the $i^{th}$ quantity $V_i$ by a colour palette $P_i = \{C_{i1}, C_{i2}, C_{i3}, \ldots\}$, where $C_{ij} \in R$ and the palettes are disjoint, as per $P_i \cap P_k = \emptyset$ for all $i \neq k$. All colour palettes need not be disjoint, but it is sufficient that palettes used for representing quantities in overlapping supervised regions are disjoint. Additionally, one or more neutral colours common to all supervised regions may be used. (In the sense of the appended claims, the colours in a palette act as specific elements in the pixel value range, whereas the at least one neutral colour acts as a non-specific element.) With this configuration, the checksum for verifying the representation of quantity $V_i$ may be based on colours in palette $P_i$ and no others. The same effect is achieved if the checksum for verifying the representation of quantity $V_i$ is based on the entire pixel value range R while excluding any colours that are used for representing different quantities in the same supervised region or in any overlapping supervised region. For instance, the checksum for verifying the representation of quantity $V_2$ in supervised region 312 may be based on the colours in the set $R \setminus (P_1 \cup P_4 \cup P_5 \cup P_6)$. Hence, for a given image frame, all pixels for which the display drive signal S2 defines a colour in $P_1 \cup P_4 \cup P_5 \cup P_6$ will be excluded from contributing to the checksum.

The influence from the status indicators 305, 306 on the checksum for supervising quantity $V_2$ may be removed by defining a bitmask covering the locations of the status indicators 305, 306, so that these are left out in the checksum computation. Alternatively, and especially if the indicator finger in the meter panel 302 intersects any of the status indicators 305, 306 when it represents certain values of quantity $V_2$, the status indicators may be represented using a pixel value which is different from the pixel value by which the indicator finger is drawn and is excluded from contributing to this checksum.

The systems and methods disclosed hereinabove may be implemented as software, firmware, hardware or a combination thereof. In a hardware implementation, the division of tasks between functional units referred to in the above description does not necessarily correspond to the division into physical units; to the contrary, one physical component may have multiple functionalities, and one task may be carried out by several physical components in cooperation. Further embodiments of the present invention will become apparent to a person skilled in the art after studying the description above. Even though the present description and drawings disclose embodiments and examples, the invention is not restricted to these specific examples. Numerous modifications and variations can be made without departing from the scope of the present invention, which is defined by the accompanying claims. Any reference signs appearing in the claims are not to be understood as limiting their scope.

The invention claimed is:

1. A method of presenting information encoded in an input signal on a visual display adapted to display at least one image frame based on a display drive signal comprising pixel values in a predefined discrete pixel value range, the method comprising:
    based on an input signal, generating a display drive signal controlling the visual display;
    based on the display drive signal, computing a checksum of a supervised region of each image frame; and
    verifying the display drive signal for a given image frame by comparing the checksum, or a value derived therefrom, with the input signal, or a value derived therefrom,
    wherein the checksum is computed while excluding at least one element in the pixel value range from contributing to the checksum, said exclusion comprising filtering the pixel values such that pixel values equal to the excluded at least one element are omitted or replaced by neutral values.

2. The method of claim 1, further comprising:
initially receiving data identifying a supervised region and at least one associated excluded element in the pixel value range.

3. The method of claim 1, wherein:
the information encoded in the input signal includes at least two independently variable quantities to be represented in partially overlapping supervised regions;
the display drive signal is generated by representing each of said independently variable quantities using a specific element in the pixel value range, which element is not used to represent any other quantity of said at least two independently variable quantities; and
the checksum of a given supervised region is computed while excluding the specific element of a different supervised region from contributing.

4. The method of claim 3, wherein:
the display drive signal is generated by further using a non-specific element in the pixel value range in at least two of said supervised regions; and
the checksum of a given supervised region is computed while excluding the specific element of a different supervised region and the non-specific element from contributing.

5. The method of claim 1, wherein the verification of the display drive signal includes retrieving data from a memory storing predefined input signal values and associated pre-computed reference checksums.

6. The method of claim 1, wherein the checksum is computed while further excluding at least one pixel position from contributing to the checksum.

7. A computer program product comprising a non-transitory computer-readable medium with instructions for causing a programmable computer to perform the method of claim 1.

8. A visual display controller, connectable to a processor which is adapted to:
receive an input signal; and
generate, based on the input signal, a display drive signal comprising pixel values in a predefined discrete pixel value range and controlling a visual display adapted to display at least one image frame based on the display drive signal,
the visual display controller comprising:
a checksum extractor adapted to compute a checksum of a supervised region of each image frame based on the display drive signal; and
a display supervisor adapted to verify the display drive signal for a given image frame by comparing the checksum, or a value derived therefrom, with the input signal, or a value derived therefrom,
wherein a colour filter is arranged between the processor and the checksum extractor and is configured to exclude at least one element in the pixel value range from contributing to the checksum, the colour filter being configured to filter the pixel values such that pixel values equal to the excluded at least one element are omitted or replaced by neutral values.

9. The visual display controller of claim 8, wherein the colour filter is configured to exclude a first element in the predefined pixel value range from contributing to the checksum of a first supervised region and further configured to exclude a second element in the predefined pixel value range, different from the first element, from contributing to the checksum of a second supervised region.

10. The visual display controller of claim 8, further comprising the processor,
wherein the processor is adapted to generate the display drive signal based on an input signal including at least two independently variable quantities to be represented in partially overlapping supervised regions, wherein the display drive signal is generated by representing each of said independently variable quantities using a specific element in the pixel value range, which element is not used to represent any other quantity of said at least two independently variable quantities.

11. The visual display controller of claim 8, further comprising a memory for storing predefined input signal values and associated pre-computed reference checksums.

12. The visual display controller of claim 8, further comprising a bitmask filter arranged between the processor and the checksum extractor and configured to exclude at least one pixel position from contributing to the checksum.

13. The method of claim 1, wherein each said excluded element in the pixel value range corresponds to a pixel colour to be displayed by the visual display.

14. The method of claim 1, wherein at least two elements in the pixel value range are excluded from contributing to the checksum.

15. The method of claim 3, wherein said specific elements belonging to different supervised regions correspond to pixel colours which are visually indistinguishable.

* * * * *